G. K. LIGHT.
PUMPING DEVICE.
APPLICATION FILED APR. 24, 1920.
1,390,051.
Patented Sept. 6, 1921.
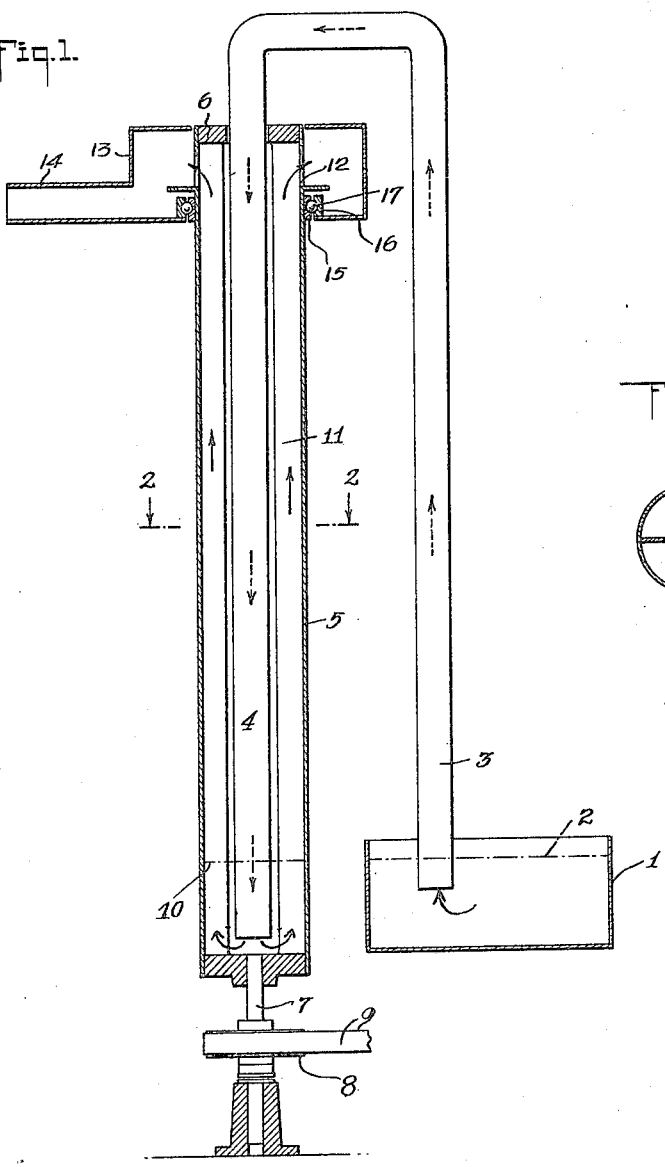
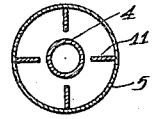
WITNESSES
Frederick Diehl.
Robert J. Hulsizer.
INVENTOR
George K. Light.
BY
ATTORNEYS

UNITED STATES PATENT OFFICE.

GEORGE K. LIGHT, OF BROOKLYN, NEW YORK.

PUMPING DEVICE.

1,390,051.

Specification of Letters Patent.

Patented Sept. 6, 1921.

Application filed April 24, 1920. Serial No. 376,393.

*To all whom it may concern:*

Be it known that I, GEORGE K. LIGHT, a citizen of the United States, and a resident of the city of New York, borough of Brooklyn, in the county of Kings and State of New York, have invented a new and Improved Pumping Device, of which the following is a full, clear, and exact description.

This invention relates to pumping devices, and has particular reference to a simple and efficiently operated pump of the rotating type.

An object of the invention is to provide a pump which in a simple and efficient manner causes a constant flow of liquid through the pump as a result of a new application of the centrifugal action taking place in the rotating receptacles.

Another object of the invention resides in the provision of means whereby the operation of the pump requires an expenditure of a minimum amount of power and comprises apparatus which is composed of a minimum number of parts.

A further object resides in the particular construction and arrangement of parts hereinafter described and claimed and shown in the accompanying drawings.

The invention, in general, comprises a receptacle with which a siphon is associated to establish a normal liquid level in the receptacle. Means are provided for rotating the receptacle so that the centrifugal action on the liquid tends to alter and reduce the level of the liquid within the receptacle in such a manner that the siphonic action is started and tends to renew or restore the disturbed or altered level. This action results in the continuous introduction of liquid into the receptacle in a constant stream. The liquid is discharged from the receptacle by reason of the fact that the centrifugal action resulting when the receptacle is rotated causes the liquid surfaces to be disposed in lines parallel to the sides of the receptacle, whereby the liquid climbs the walls thereof until it reaches a suitable outlet, from which it is discharged. By reason of the momentum initially imparted to the liquid, and by reason of the automatic action of the siphon to introduce new liquid into the receptacle, the operation of this device requires the expenditure of a constant and small amount of power. The simplicity of the device in its structural features makes it highly advantageous and efficient in operation.

The invention is illustrated in the drawings, of which—

Figure 1 is a partial vertical longitudinal section taken through the pump receptacle;

Fig. 2 is a horizontal section taken on the line 2—2 of Fig. 1.

The drawings illustrate one form which my invention in its application may assume, and comprises a tank 1 containing a suitable quantity of water the level of which is indicated by the numeral 2. This tank may be of any suitable size but provision may be made to supply a constant amount of water thereto while the pump is in operation. Into this tank 1 an arm 3 of a siphon depends, the other arm 4 of which is adapted to project downwardly into the pumping receptacle 5. The arm 4 passes through a plug or closure portion 6 in the top of the receptacle 5 and fits therein in a reasonably snug manner. The bottom of the receptacle 5 is closed and connected to a shaft 7 having thereon a pulley 8 which is driven by a belt 9 connected to any suitable source of power.

In a manner usual in siphonic actions, the lower end of the arm 4 of the siphon is at a lower level than the lower end of the arm 3. The siphon having been filled in the usual manner, the water from the tank 1 flows into the receptacle 5 until a level 10 is established therein equal to the level 2 in the tank 1. Disposed vertically along the walls within the receptacle 5 are a plurality of blades 11 which extend from the inner face of the receptacle 5 radially toward the center thereof. These blades extend only part of the way toward the center, and the ends of the blades are spaced a suitable distance from the surface of the arm 4 of the siphon. These blades may be disposed within and connected to the receptacle in any suitable manner (not shown). The upper end of the receptacle is provided with apertures 12 leading to a chamber 13 having a pipe connection 14 as an outlet therefrom. A bearing flange 15 is provided on the upper end of the receptacle 5 which coöperates with a similar bearing 16 on the closure portion 13 by means of ball bearings 17 to permit the rotation of the receptacle 5 with respect to the closure portion 13 with a minimum amount of friction therebetween.

Assuming that the siphonic action has taken place to an extent necessary to establish the equal levels 2 and 10 above mentioned, when the receptacle 5 is rotated the liquid will tend to rotate with the receptacle, and this rotation is assisted by the action of the blades 11 on the liquid, tending to carry it around with much less slopping than would be the case if the blades were not in a receptacle. By reason of the fact that these blades extend vertically along the inner walls of the receptacle and radially into the receptacle from the walls, they do not assist in lifting the water but merely promote the effective rotation of the water with the receptacle. As soon as the rotation of the receptacle commences, the centrifugal action will tend to alter the level 10 of the liquid; and as the speed of the receptacle increases, the liquid initially in the receptacle will assume a position with its surface parallel to the walls of the receptacle. This will result in the lowering or alteration of the original level 10, whereby the siphonic action immediately begins to introduce more liquid into the rotating receptacle, tending to restore the original level. However, this freshly introduced liquid will immediately commence to rotate with the receptacle and assume the altered position above mentioned, displacing the original quantity of liquid farther up the sides of the receptacle. This action will continue as long as the receptacle is rotated until the liquid has been moved up along the walls of the receptacle 5 and discharged from the outlets 12 into the closure 13 and out of the pipe 14.

It will be observed, therefore, that by this construction I have provided a pumping device which is simple in its operation and in the parts whereby its operation is effected. By reason of the centrifugal action on the liquid, the normal level of the liquid is altered, and this action in combination with the siphon which automatically comes into operation upon the alteration of the normal level, results in the pump requiring a minimum expenditure of power to produce a constant stream of liquid which may be forced to any desired height.

What I claim is:

1. A pumping device comprising a vertically disposed rotatable receptacle, a plurality of radially extending blades extending longitudinally within said receptacle, discharge openings at the upper end of said receptacle, and a siphon associated with said receptacle, the longer arm of said siphon extending into and disposed adjacent the bottom of said receptacle whereby when the normal level of the liquid within the receptacle is altered by the rotation of the receptacle the siphon will immediately supply more liquid to the receptacle.

2. A pumping device comprising a rotatable pipe vertically disposed, a plurality of longitudinally and radially extending guide blades therein, a hood over the upper end of said pipe adapted to receive water discharged therefrom, said pipe having a plurality of discharge apertures in its upper end adjacent the hood, a siphon arm extending into said pipe, the lower end of the arm being disposed adjacent the bottom of the receptacle, and means for rotating said pipe.

GEORGE K. LIGHT.